No. 765,951. PATENTED JULY 26, 1904.
J. ALBRECHT.
MANURE LOADING DEVICE.
APPLICATION FILED FEB. 19, 1904.
NO MODEL. 2 SHEETS—SHEET 1.
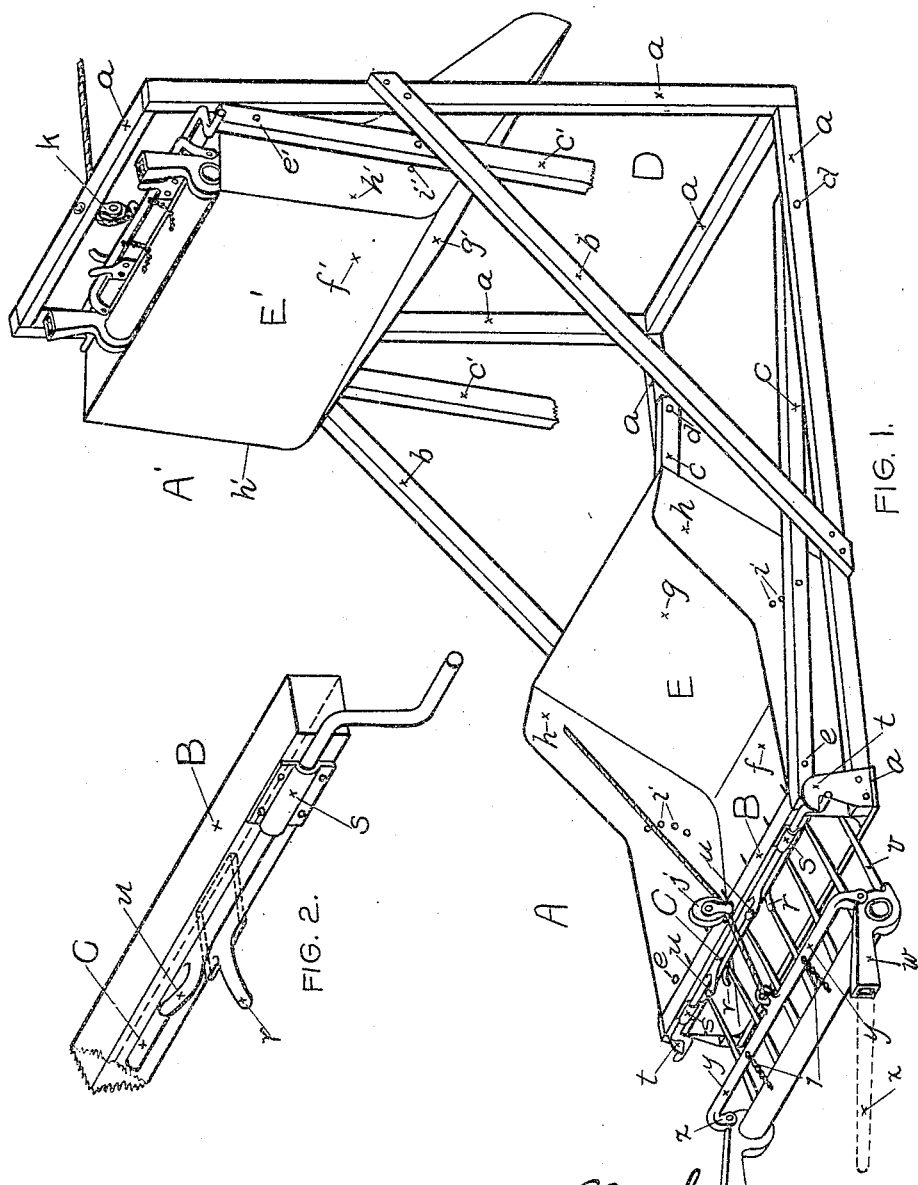

No. 765,951. PATENTED JULY 26, 1904.
J. ALBRECHT.
MANURE LOADING DEVICE.
APPLICATION FILED FEB. 19, 1904.
NO MODEL. 2 SHEETS—SHEET 2.

WITNESSES:

John Albrecht
INVENTOR.
BY
ATTORNEY.

No. 765,951.                                              Patented July 26, 1904.

UNITED STATES PATENT OFFICE.

JOHN ALBRECHT, OF MIDDLETON, WISCONSIN.

MANURE-LOADING DEVICE.

SPECIFICATION forming part of Letters Patent No. 765,951, dated July 26, 1904.

Application filed February 19, 1904. Serial No. 194,434. (No model.)

*To all whom it may concern:*

Be it known that I, JOHN ALBRECHT, a citizen of the United States, residing in the town of Middleton, county of Dane, and State of Wisconsin, have invented a new and useful Manure-Loading Machine, of which the following is a specification.

My invention relates to an improvement in manure-loading devices in which the material is collected, transported, and raised to a convenient height for loading upon some conveyance. I attain these objects by the mechanism illustrated in the accompanying drawings, in which—

Figure 4:
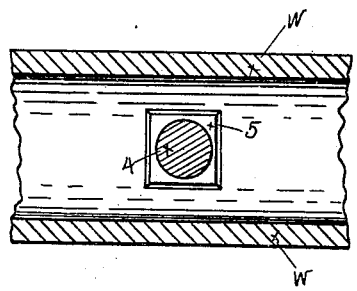
Figure 5:
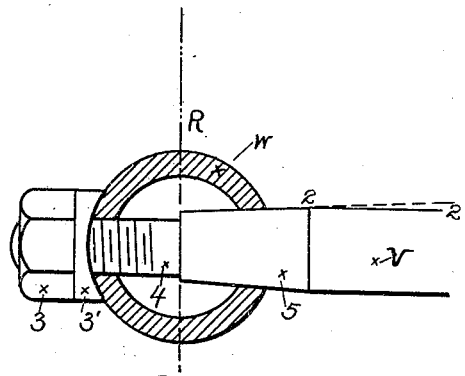
Figure 3:
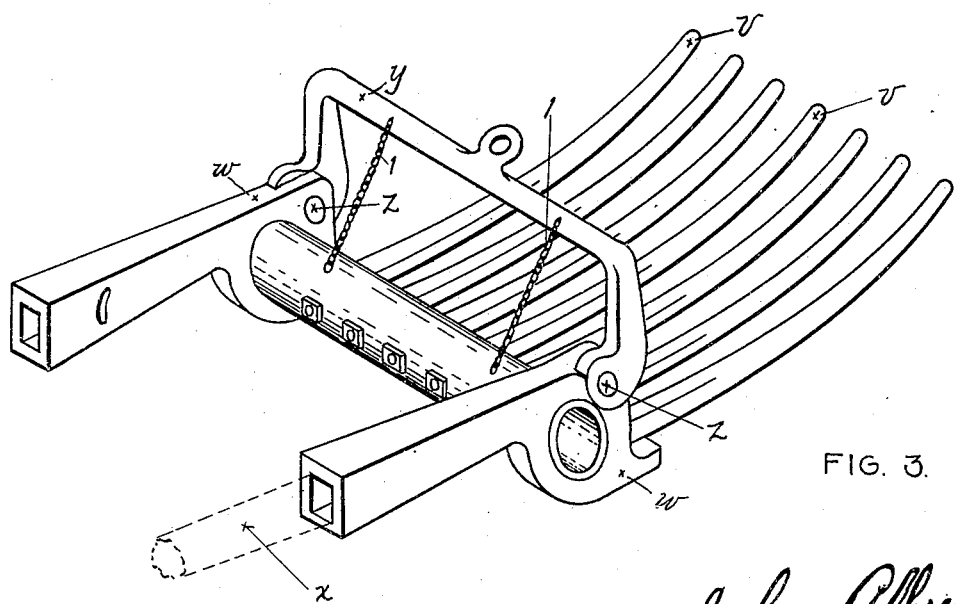

Figure 1 is a general view of the mechanism in two positions A A', the position at the left and lower part of the illustration being the entering position of the fork into the chute, and A', the position at the top and right of the illustration, that of the discharging position of the fork and the chute. The frame supports the apparatus in all positions. Fig. 2 is an enlarged view of a portion of cross-rail B, showing the lug $r$ and a part of the tripping device; Fig. 3, a general view of the fork complete; Figs. 4 and 5, detailed views of the tine ends and method of fastening.

Similar characters refer to similar parts throughout the several views. When the two positions in Fig. 1 are spoken of, prime letters refer to the position at A' and the same letters not primed to the position at A.

The supporting-frame D consists of the parts A $a$ and the braces $b$ $b$, substantially bolted together. The supporting-arms $c$ $c$ $c'$ $c'$ are fastened to the frame at $d$ $d$, about which points they revolve, and to the chute at $e$ $e$ $e'$.

The chute E E' consists of a bottom $f$ $f'$, a front $g$ $g'$, two sides $h$ $h$ $h'$ $h'$, and the cross-rail B. In its loading position the edge next the fork is near the ground. $f$ and $g$ form such an angle with respect to each other that in the discharging position A' the front $g'$ makes an angle with respect to the earth of from thirty-four degrees to fifty degrees. The sides $h$ $h$ assist in retaining the material between the loading and discharging positions. The chute is adjustable through an angle of sixteen degrees about the centers $e$ $e$ by means of bolts passed through the holes $i$ $i'$, so as to give the various discharge-angles between thirty-four degrees and fifty degrees. The cross-rail B is securely fastened to the supporting-arms $c$ $c$ near the ends and supports the pulley $j$, the lugs $r$ $r$, Figs. 1 and 2, and the trip-lever C, Figs. 1 and 2. The trip-lever C is a rod of iron fastened by strap-bearings $s$ $s$ to the cross-rail B and has two crank ends, one at each side, which catch under the hooks $t$ $t$, placed at each end and fastened rigidly to the frame D. Near the center of the trip-rod C are fastened two lugs $u$ $u$, so formed as to enable the cross-bar $y$ of the fork to wedge between the lugs $u$ $u$ and the lugs $r$ $r$, which latter are securely fastened to the cross-rail. This operation causes the trip-rod to turn in its bearings $s$ $s$ and release the crank ends from the hooks $t$ $t$, Fig. 1.

The fork consists of tines $v$ $v$, Figs. 1, 3, and 5, a frame $w$ $w$, handles $x$ $x$, and a draw-bar $y$, arranged as follows: The draw-bar $y$, Fig. 3, is hinged to the frame $w$ $w$ by the pins $z$ $z$ and is held from going forward by the chains $l$ $l$, Fig. 3, so that when the fork in the chute has been raised to the upright position A' the fork, with its contents, can drop down and forward, thus shaking loose the material, the draw-bar $y$ in this operation turning upon the supporting-lugs $r$ $r$ and about the pins $z$ $z$ in such a way as to leave the tines standing substantially vertical and the chains loose, as shown in position A' of Fig. 1.

The tines $v$ $v$ are made removable by the combination of a wedge-nut and washer. Fig. 5 in side view shows the tine $v$ with the portion 4 round and threaded and portion 5, Figs. 4 and 5, of rectangular section and tapered, as shown at 2 2, Fig. 5, so as to wedge into the frame $w$ when the nut 3 is screwed up against the washer 3. Fig. 4 is a sectional view taken in the plane R R.

The operation is as follows, Fig. 1: The fork is drawn back for loading, a rope passes from the draw-bar $y$ of the fork through the pulley $j$, then up over the pulley K, fastened to the top cross-bar of the frame D, and off to some source of power. Power now being applied, the fork is filled similarly to that of a dirt-scraper and drawn up until the draw-bar seats itself between the lugs $r$ $r$ and $u$ $u$, trips the rod C from under hook $t\,t$, thus releasing the chute. The fork, supported upon lugs $r\,r$, and the chute then rise together and turn about the pins $d\,d$ with a continued application of power until the upright position A' is arrived at. The fork then drops, discharging the contents, by means of the chute upon the conveyance, following which the chute and fork return by their own weight to the filling position A.

I am aware that prior to my invention elevating-machines for loose and loosely-packed material have been made. I therefore do not claim my invention broadly; but What I do claim as my invention, and desire to secure by Letters Patent, is—

1. In a manure-loader a chute consisting of a bottom, a front and sides suitably connected to the supporting-arms, and with the angle between bottom and front, and with an adjustment between supporting-arms and the chute to provide for the proper discharge-angles, with respect to the earth according to the material handled substantially as set forth.

2. In a manure-loader a cross-rail suitably fastened to the supporting-arms the cross-rail supporting a pulley, lugs, and locking device, substantially as set forth.

3. In a manure-loader, the combination of a chute and a fork the fork having a draw-bar arranged to support the fork during elevation and discharge upon lugs of cross-bar, and arranged to trip the locking device, substantially as set forth.

4. In a manure-loader a fork with the draw-bar arranged to swing from fork-frame, about pins, so as to allow fork to drop when arriving at the upright position; the draw-bar being prevented from going forward in the other position by suitably-placed chains, substantially as set forth.

5. In a manure-loader a fork with replaceable tines a portion of which at the frame end is round and threaded, followed by a portion of rectangular shape the same tapering toward the threaded end so as to wedge into frame by tightening the nut, substantially as set forth.

In testimony whereof I have, this 14th day of April, A. D. 1904, signed my name to this specification in the presence of two subscribing witnesses.

JOHN ALBRECHT.

Witnesses:
ALBERT R. DENN,
CELIA MAIN.